United States Patent Office 3,355,205
Patented Nov. 28, 1967

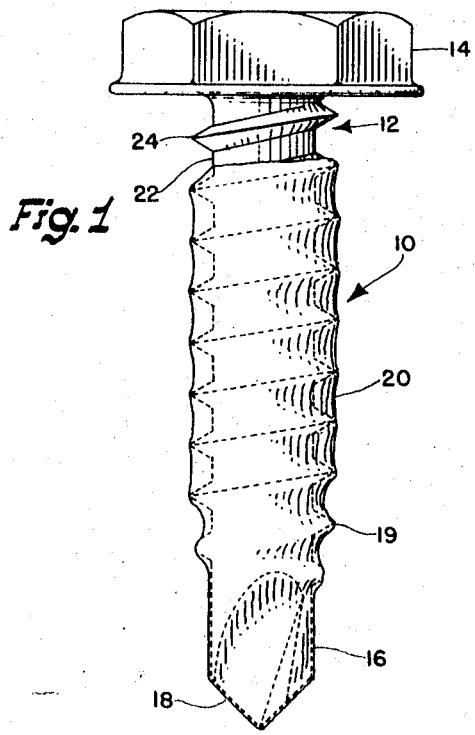
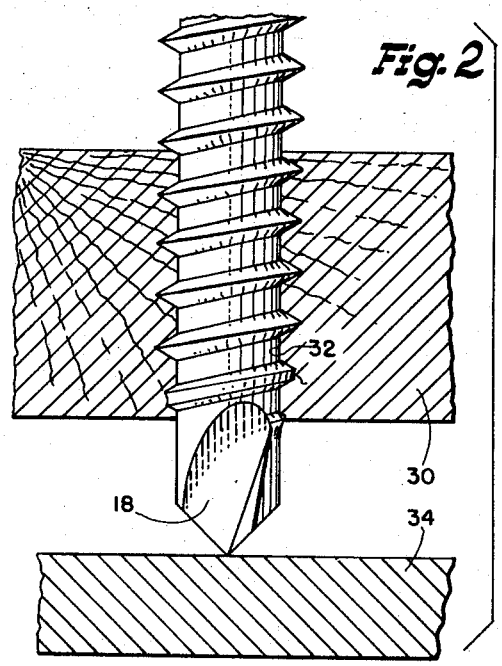
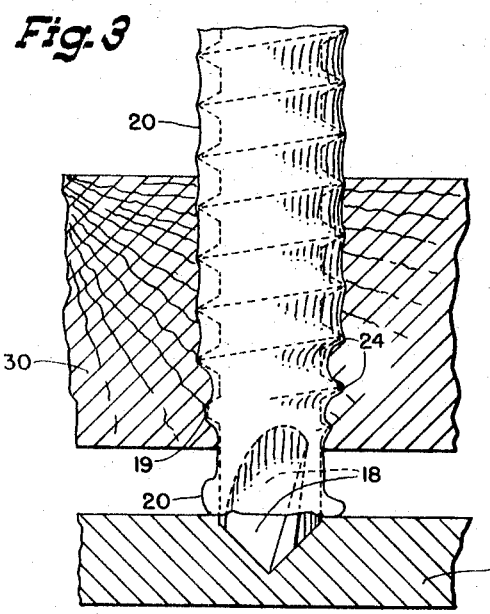
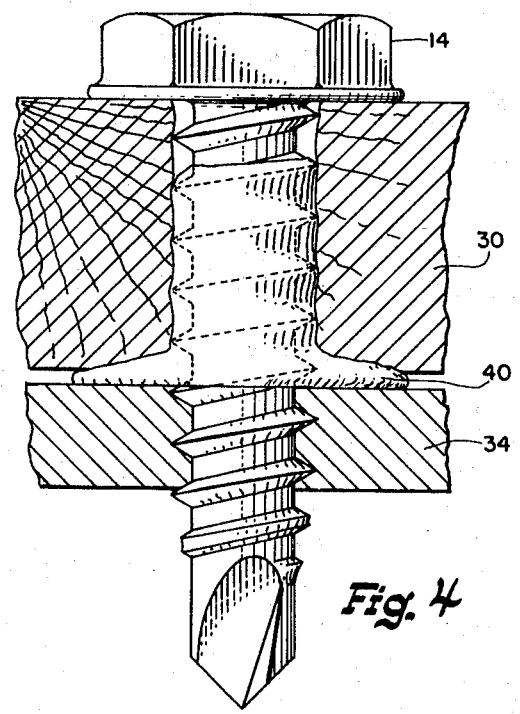

3,355,205
FUNCTIONAL COATING OF DRILL SCREWS
David P. Wagner, Elmhurst, and Charles E. Gutshall, Roselle, Ill., assignors to Illinois Tool Works Inc., Chicago, Ill., a corporation of Delaware
Filed Dec. 16, 1965, Ser. No. 514,276
7 Claims. (Cl. 287—189.36)

ABSTRACT OF THE DISCLOSURE

There is disclosed a self-drilling screw having a coating which fills the voids of a substantial portion of the threads along the shank of the screw. The coating is softer than the screw but is harder than a first work panel and softer than a second work panel through which the screw is to be applied whereby the threads formed by the entering end of the screw are strippable by the coated portion of the shank thereby permitting free rotation of the screw during the drilling of the second panel which strips off the coating to expose the threads for intimate contact with the drilled hole in the second panel.

In the art of fastening a common problem has confronted the users of screw threaded fastenings when they desired to fasten two juxtaposed panels. Normally it has been the practice to provide a pilot hole in the outermost panel to prevent the threads of the screw from engaging said panel but permitting engagement of the screw threads with the second panel whereby the two panels could be drawn up tightly. In situations where no pilot hole is provided it has been the common experience that the screw threads engaging the first panel will tend to raise that panel away from the second panel and additionally will often cause the head of the screw to bottom on the outer surface of the first panel and prevent rotation when such rotation is necessary to permit the screw thread engagement with the second panel.

It is an object of the present invention to provide means for permitting the association of two juxtaposed panels without any preliminary preparation, such as pilot holes or clearance holes in either of the panels.

A further object of the invention is to provide a functional coating on a drill screw which will permit the screw to be passed through a first panel and thence through a juxtaposed second panel to draw together the two panels without preliminary hole preparation in the first panel.

Another object of the invention is to provide a coating on a screw wherein said coating is harder than the first panel through which it is to pass but softer than the second panel through which it is to pass. The coating on the screw being adapted to fill the voids between threads on the shank so as to form an imperfect strippable mating thread in the first panel with said coating being stripped off of said screw upon contact with said second panel whereby the threads will form a complementary female thread in the second panel.

Other objects of the invention will become apparent to those skilled in the art when the specification is read in the light of the accompanying drawing wherein:

FIG. 1 is an elevational view of a screw having a coating on a portion of its tip and its threaded shank as contemplated by the present invention;

FIG. 2 is an elevation in partial section of a normal threaded fastener without such a coating showing the expected result when it is applied to two panel members;

FIG. 3 is a screw of the type shown in FIG. 1 embodying the teachings of the present invention, i.e., having a coating thereon, as it is applied to two juxtaposed panels; and FIG. 4 is a showing of the embodiment of this invention in the final position it will assume during the fastening of two juxtaposed panels.

Referring now to the drawing wherein similar parts are designated by similar numerals, and particularly FIG. 1, the present invention contemplates a screw 10 having a threaded shank 12 with a head 14 at one end having driving means and an entering end portion 16 at the opposite extremity. In the illustrated embodiment the end portion 16 includes a fluted drill point 18 of the type shown in United States Patent No. 3,125,923, although applicant does not intend to have his teachings limited to such a specific type of screw, it being merely an illustrative example for purposes of disclosure.

A coating 20 is preferably applied to the screw so that the coating 20 will partially cover the fluted drilling point 18 and a substantial portion of the threaded shank 12. As is common the threads on shank 12 include a root 22 and a crest 24. The coating 20 is adapted to substantially fill the voids between adjacent threads which exist between the root 22 and the crest 24, for purposes best set forth hereinafter. As can be seen in FIG. 1, the coating, when viewed in elevation, will provide a scalloped effect with only a minimum portion of the crest 24 of the threads being exposed to the exterior.

It has been found that coatings of the type desired to attain the results brought about by the present invention can include both organic and inorganic materials. The main prerequisite in the choice of such a material is that it must have the ability to adhere to the screw when the screw is passed through certain types of material, i.e., materials which are softer than the coating, and further must be capable of being stripped off of the screw when the screw is passed through materials which are harder than the coating. In the inorganic materials it has been found that certain ceramic materials can be baked on to the screw while in the organic materials the epoxy resins have been found most desirable. More particularly, applicant has found that a diepoxide resin modified by coordinate complex salts is the most desirable, although other combinations of materials will undoubtedly be apparent to those skilled in the art. The aforementioned salts are used as a curing agent whose catalytic action is actuated by elevated temperatures, as set forth hereinafter.

The method of coating such a screw would include the steps of dipping the drilling tip and shank of the screw in a bath of modified diepoxide resin, allowing the material to drain after removal from the resin bath, inverting the screw so that its drill point is in the elevated position and at the same time heating the screw to permit portions of the coating to flow out of the cutting flutes and away from the cutting edges of the drill tip 18 and also away from the crest of the first few threads 19 adjacent to the drill point. Preferably, when a diepoxide resin is used this heating cycle should be at a temperature of approximately 325° F. for a period of about six minutes while the screws are maintained in the inverted position. The coating is then cured for a period of two to four hours at 350° F.

As can be best seen in FIG. 2, which is an example of the prior art, when an uncoated drill screw of the type contemplated is inserted through a hardwood panel 30, it will drill its own hole 32 and cut a complementary tight fitting female thread in said panel 30. When the drill point 18 has passed through the panel 30 and comes into contact with an adjacent metallic panel 34 it has a tendency to separate the panels 30 and 34. The mating threads in panel 30 do not permit the free rotation of the screw when it engages panel 34 and hence it virtually becomes impossible to draw the panels into juxtaposed relation.

When the coating of the present invention is utilized, as best seen in FIGS. 3 and 4 the drilling tip 18 and the first few adjacent threads 19 will drill a hole and cut a partial thread in panel 30 so as to move the fastener through the panel 30. The following or remaining threads which are substantially covered by the coating 20 ream or laterally expand the bore 32 formed by the drill tip 18 and the first few threads 19. As can be best seen in FIG. 4 the partially formed female threads in the panel 30 contacted by the coating material 20 and its associated minimum exposure of crests 24 provides a minimal contact between said crests and the material of panel 30. When the drill tip 18 reaches the panel 34, the panel 34 being harder than the coating 20 will commence to scrape or scive the material 20 from the surface of the screw shank 12. The scraped off coating 20 tends to spread laterally and being harder than panel 30 will tend to compress the adjacent portions of panel 30 surrounding the drilled aperture and form a globule or mass 40 at the juncture between the panels 30 and 34. The screw 10 is permitted to rotate normally or freely to drill and form threads on the harder panel 34 since there is minimal or readily strippable thread engagement in the upper panel 30. Thus, as shown in the drawing, the two panels can be brought into juxtaposed relation without any preliminary operations such as drilling or pilot hole preparation being carried out before the fastening operation.

It should be noted that while a specific form of drill tip has been shown, for the purposes of illustrating a specific embodiment, there are many other forms of drilling tips to which the invention is equally applicable. Similarly the invention can be utilized under many circumstances where two panels of dissimilar hardness are to be mounted in abutting or juxtaposed relation, for example, it would be totally possible to employ the teachings of the present invention on a spaced thread or wood screw when utilized with a soft wood in abutting relation to a hardwood, i.e., pine against oak. In the illustrated embodiment the applicant has utilized the use of a wood panel 30 in juxtaposed relation to a metallic member 34. For example, this screw is excellent in the joining of oak flooring to steel structural members in semi-trailer bodies. Additionally, applicant's use of the term hardwood should include any of those woods commonly known in the trade as hardwoods plus certain plywoods which because of their resinous bonding materials will have a toughness resembling the natural hardwoods even though the basic wood fibers utilized would be selected from the softer woods.

Certain other variations will be apparent to those skilled in the art but it is intended that such variations be included within the teachings of this invention as limited only by the appended claims.

We claim:
1. In combination a coated self-drilling screw fastening a first imperforate panel in juxtaposed relation to a second imperforate panel, said first panel having a predetermined hardness and said second panel having a greater relative hardness than said first panel, said screw including a head having driving means, a threaded shank and a drilling tip on the extremity of the entering end of said shank opposite said head, a coating on said shank and a substantial portion of said entering end, said coating filling a substantial portion of the void existing between the root and crest diameters along a substantial axial extent of the threaded portion of said shank whereby only a minimal portion of the crests of said threads are available for contact with a work panel, said coating having a lesser degree of hardness than said screw, said coating being harder than the predetermined hardness of said first panel through which the screw is applied and said coating being softer than the second panel to which the screw is applied, said screw being harder than both panels, whereby said drilling tip and said entering end will form a hole and partial thread to pull said screw through said first panel with said coating and its associated minimal exposed crests on said threaded shank providing readily strippable engagement in said first panel to permit free rotation of said screw during the drilling of said second panel, said coating being stripped off to said screw by said second harder panel to expose the threads on said shank for intimate engagement with said second panel whereby said panels are drawn into juxtaposed relation.

2. A device of the type claimed in claim 1 wherein said coating is a ceramic material.

3. A device of the type claimed in claim 1 wherein said coating progressively increases in thickness from the entering end portion of the screw towards the head of the screw.

4. A device of the type claimed in claim 1 wherein said coating on said screw is an epoxy resin.

5. A device of the type claimed in claim 4 wherein said coating is a diepoxide resin modified by coordinate complex salts.

6. A device of the type claimed in claim 1 wherein said first panel is wood and said second panel is metallic in nature.

7. A device of the type claimed in claim 6 wherein the wood panel is chosen from a class of hardwoods and said metallic panel is steel.

References Cited

UNITED STATES PATENTS

| | | | |
|---|---|---|---|
| 2,122,915 | 7/1938 | Olson | 85—41 |
| 2,203,294 | 6/1940 | Engle | 85—10.1 |
| 2,718,647 | 9/1955 | Raible | 85—1 |
| 2,724,303 | 11/1955 | Holcombe | 85—10.1 |
| 2,901,099 | 8/1959 | Krieble | 117—132 |
| 3,061,455 | 10/1962 | Anthony | 85—1 |
| 3,101,207 | 8/1963 | Pavel et al. | 117—132 |

FOREIGN PATENTS

| | | |
|---|---|---|
| 696,358 | 10/1964 | Canada. |

MARION PARSONS, Jr., *Primary Examiner.*